United States Patent [19]
Parkinson

[11] Patent Number: 6,053,647
[45] Date of Patent: Apr. 25, 2000

[54] USER-FRIENDLY AND EFFICIENT KEYBOARD

[76] Inventor: John V. Parkinson, 708 E. Cook St., Santa Maria, Calif. 93454

[21] Appl. No.: 09/124,810

[22] Filed: Jul. 29, 1998

[51] Int. Cl.[7] .......................................................... B41J 5/08
[52] U.S. Cl. ............................................ 400/486; 400/489
[58] Field of Search .................................... 400/486, 489; 341/22; 345/168

[56] References Cited

U.S. PATENT DOCUMENTS

| | | | |
|---|---|---|---|
| 1,337,977 | 4/1920 | Hillard | 400/486 |
| 4,522,518 | 6/1985 | Schmidt | 400/486 |
| 4,755,072 | 7/1988 | Hoornweg | 400/490 |
| 4,927,279 | 5/1990 | Morgan | 400/486 |
| 5,476,332 | 12/1995 | Cleveland, Jr. | 480/486 |
| 5,483,235 | 1/1996 | Hanson et al. | 341/20 |
| 5,584,588 | 12/1996 | Harbaugh | 400/486 |
| 5,700,097 | 12/1997 | Kuhlenschmidt | 400/487 |

*Primary Examiner*—John S. Hilten
*Assistant Examiner*—Dave A Ghatt

[57] ABSTRACT

For keyboards, the present invention provides a method of determining suitable letter arrangements, to create an arrangement that is both user-friendly and efficient. The letters in the preferred embodiment are in the familiar alphabetical order so they are easy to find, and their locations are easy to learn and retain. The alphabetical sequence goes from left to right, row by row from top to bottom, first for the left hand, then for the right hand, like reading the pages of a book. This arrangement optimizes efficiency and user-friendliness, maximizing the separation of the most commonly used pairs of letters into the faster, two-handed sequences, while providing a logical and easily recognized layout. The usual four punctuation marks are placed within the layout so as to enhance both of these qualities. The locations chosen add visual symmetry and help to indicate the home positions of the fingers and the division for left and right hands, for a more intuitive and user-friendly layout: they also minimize the frequency of slow or awkward same-finger sequences, yielding higher typing speeds with reduced errors for improved efficiency. The invention far surpasses the existing standard keyboard in both efficiency and user-friendly qualities, and is therefore eminently suitable for both full-time professionals and occasional users.

12 Claims, 1 Drawing Sheet

USER-FRIENDLY AND EFFICIENT KEYBOARD

FIELD OF INVENTION

This invention relates to equipment such as typewriters, computers and communications systems; more specifically, to keyboards providing a manual interface between such equipment and an operator.

SUMMARY OF THE INVENTION

The invention provides an improved method of determining the optimum arrangement of letter allocations on a keyboard, taking all conflicting requirements into account. The preferred embodiment arranges the letters in an alphabetical order, in a symmetrical visual array which is easy to learn and remember, fast and efficient in use, and suitable for both full-time and incidental users.

BACKGROUND

The standard keyboard supplied with most office equipment has the alpha characters allocated to the keys in what is usually known as the "qwerty" arrangement. This was originally designed for mechanical typewriters in the nineteenth century. Because of the particular locations of letters on the keyboard, many of the most frequently used letter sequences involve difficult, awkward or slow finger movements, which cause errors, fatigue, and reduced typing speeds. It has long been known that the letter allocations are unsatisfactory, and there have been previous attempts to improve them.

Figure 1:
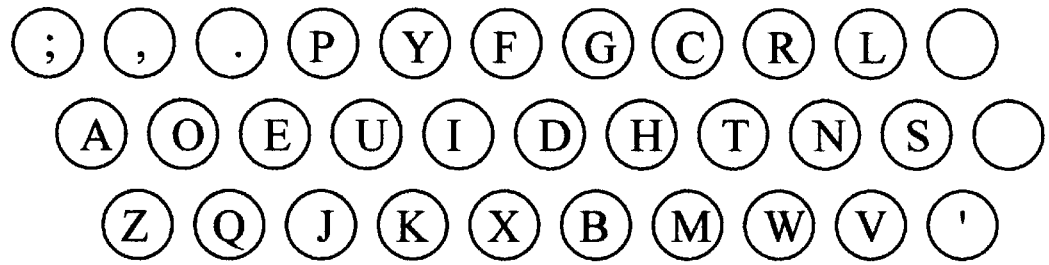
FIG. 1 (Prior art) shows the arrangement of letters devised by Dvorak for improved efficiency over qwerty.

The most significant attempt, by Dvorak et al. appeared in U.S. Pat. No. 2,040,248 in May 1936; maximum efficiency for the expert typist was the dominant theme. In this landmark patent, Dvorak presented a keyboard designed on strictly scientific principles. The allocation of characters preferred by Dvorak is shown in FIG. 1 (Prior art). He was concerned with twenty-six letters and four punctuation marks, these thirty characters were assigned to keys in three rows often keys each, with five columns for each hand, consistent with the recognized touch-typing method normally used on the standard qwerty keyboard. The present invention is not concerned with additional keys outside this basic set of thirty. Also, although Dvorak shows the columns of keys leaning to the left, such a slope is not a part of the letter allocations, and the columns could equally well be vertical, or leaning to the right.

Dramatic results were claimed for reduced fatigue, improved accuracy and greater speed, but despite repeated attempts to promote it during the past sixty years, it has failed to replace qwerty as the standard keyboard. This failure is at least partly due to deficiencies in the design itself. However, Dvorak is still generally recognized as being the best design available, the high point of the prior art, and it, rather than qwerty, therefore makes an appropriate starting point.

The Dvorak Advance

Previous attempts had mainly addressed the frequency of use of individual letters, simply aiming to assign the most frequently used letters, notably E, to the strongest fingers. Dvorak advanced the art by considering the typing of letter sequences, in particular, two-letter sequences, which he called digraphs. His concern was the speed with which any particular digraph could be typed, and how the speed was affected by the positions of the letters; thus the primary focus was on the spatial relationship between the pairs of letters which formed the common digraphs. However, while providing a wealth of basic data in the patent, there are weaknesses in the way the data is used, or in some cases, not used.

Misleading Tabulation

Dvorak uses the word "digraph" in the sense of a particular pair of letters typed in a particular order. Even though EY and YE involve the same two letters, they are two separate digraphs because they are typed in different orders.

In his Table 1, Dvorak shows how often each digraph is used in written English. Each number in the Table gives the relative frequency of occurrence of a particular digraph, with the higher numbers indicating the more common digraphs. Thus there are two scores for each pair of letters, such as 6 for EY, and 4 for YE, showing that one order occurs 50% more often than the other.

Now, re-arranging the letters on the keyboard to change the speed of EY also changes YE; one cannot be changed without also changing the other. Therefore the main point of interest is the total score, in this case 10, for a pair of letters, rather than the two individual scores for each digraph. Giving two separate scores for every pair of letters can be mis-leading, as the following example shows.

Ranking the scores shown by Dvorak, the highest number at the top of the list is 144 for the digraph TH, so the letters T and H look like the most important pair of letters in the typists alphabet. With a score of only 85, the digraph ER appears to be much less significant, and in fact comes fifth on the list. However, when the reverse-order digraphs are considered, the picture changes completely. HT only occurs wit a frequency of 5, so the total of both digraphs for those two letters, 144 plus 5, is 149. In contrast, when the scores for ER (85) and RE (77) are combined, this letter-pair is seen to be the outright leader with a total frequency of 162. Thus the most important pair of letters is E and R, not T and H.

According to Dvorak, the fastest sequences are typed with alternate hands on keys in the same row, yet he places B in the home row, and R in the row above. This second-best location may be acceptable for a moderate frequency of 85, but not for the leading pair which occurs almost twice that often with a frequency of 162.

To show the true picture more clearly and thereby attain the right objectives, the frequencies of Table 1 can usefully be consolidated into a single total for each pair of letters.

Unused Information

Valuable information which is not fully used compares the speeds for several different kinds of finger sequence. Dvorak (page 2, line 61) assumes an overall average speed of 130 words per minute (WPM), and finds on average that digraphs employing opposite hands are written at the highest speed (145 WPM), an improvement of 11.5%. However, not all digraphs can be arranged across two hands, many must be typed with one hand, and it is the awkward one-hand sequences that are Dvorak's chief concern.

We can ignore same-letter digraphs such as "tt" because they involve only one key and cannot be improved.

Otherwise, the speeds for one-hand digraphs are: with remote fingers, 122 WPM; with adjacent fingers, 115 WPM; with the same finger, 70 WPM.

Even the best one-hand sequence is 6% below the overall average speed, but from the figures it can also be seen that there are big differences in the amount of loss caused by different kinds of one-hand sequence. Compared to the fastest one-hand sequence, on remote fingers, an adjacent-finger sequence causes a small drop in speed, less than 6% (122 to 115). A same-finger sequence causes a drop which is more than seven times larger, almost 43% (122 to 70). Thus for one-hand digraphs occurring with the same frequency, it would be more effective to re-arrange one, same-finger sequence into a remote-finger sequence, than to re-arrange seven adjacent-finger sequences.

These major differences between different kinds of awkward sequence do not show up at all in a measure of performance based solely on the total frequency. In Dvorak's Tables 2 and 3, the scores for all awkward sequences are lumped together with the same weighting, but if raw scores are used for same-finger frequencies, then adjacent-finger scores should be divided by seven before the two can be added together into a meaningful indication of performance.

Failing to make any allowance for the different degrees of disruption caused by different kinds of sequence leads to putting too much emphasis on minor problems which have no real impact, and too little emphasis on major problems which are very disruptive.

Inaccurate Predictions

A further problem is that errors in the theory lead to performance expectations which may not be realized in practice.

Awkward finger sequences are divided into five groups according to which fingers are used, and which rows of keys are involved. To compare the performances of the qwerty and Dvorak keyboards, the frequencies for these five groups are listed in Tables 2 and 3, where a high score indicates a poor performance.

By far the largest group in each Table is "adjacent-finger reaches", representing more than half the overall total of awkward finger sequences. The scores of 553 for qwerty, and 81 for Dvorak are derived from charts accompanying the Tables.

The qwerty chart makes no exceptions, and includes every kind of adjacent-finger sequence: sequences within any one row: those confined to the home row, sequences between first and second fingers, etc. In every case, the scores for both digraphs are included in the number shown for any one pair of letters, and contribute to the qwerty total of 553.

The corresponding chart for the Dvorak keyboard overlooks some of the adjacent-finger sequences. For example, scores for the letter sequences EO, NT, HT, and TH are omitted. When these are included, the total score for this group on the Dvorak keyboard rises from 81 to 255.

A reduction from 553 for qwerty to 255 for Dvorak is a significant improvement, but much less dramatic than a reduction to 81. Since on the Dvorak keyboard this major group of awkward reaches is more than three times larger than first supposed, it is unlikely that users of the Dvorak design will attain the speed and accuracy originally predicted.

No Compromise

A further reason why Dvorak has not replaced qwerty is a failure to reach an acceptable compromise between conflicting requirements. The design aimed only at the maximum efficiency of the finger movements, sticking strictly to the "scientific plan" on which it was based. As a result, it finished up with an apparently random scattering of letters across the keyboard, looking no more logical than the qwerty arrangement. Good design must meet all requirements, and is rarely permitted the luxury of no compromise.

In this case, two important things were overlooked. One is that psychological factors greatly affect the speed of typing, which is determined largely by deciding which finger to use and where to point it. If the keys were easier to find, and the decision-making process correspondingly faster, the overall speed may be greater, even if the physical movements of the fingers were slower. Thus if Dvorak had compromised physical efficiency to accommodate other needs, the actual increase in overall speed may have been more, not less.

The other thing is that one meaningless aray looks as bad as another at the point of sale; a design which is clearly more user-friendly than the abominable qwerty would have more acceptance in the real world, even if it did score a little lower in the laboratory.

Changing Technology

With computers came the ability to switch at will between different sets of letter allocations, typically qwerty and Dvorak. This can be accomplished either by inexpensive software that translates the input from a standard keyboard, or by purpose-made, dual-standard keyboards that change their output according to the standard selected. In either case, the only real drawback is the need to change or duplicate the key-top labeling. Although this technology has already been available for many years, and presents an ideal means by which a change can be made, Dvorak has still not taken over from qwerty as the primary standard. This lends more weight to the view that Dvorak is not the right keyboard for the job.

Even before computers, the change from manual keyboards to powered ones with a very different action, reduced the need to emphasize physical requirements. The force required on a key is much less, so fatigue is no longer such an important factor. And there is no need to strike each key a swift, even blow to produce good quality print, so rhythm and physical control are also less important. Even in Dvorak's day, equal weight should have been given to physical and mental processes: the balance has now shifted even further away from a purely physical approach.

Other technological changes have shifted the emphasis in different ways. Machine-reading capabilities, and word processors with mail-merge features have eliminated much of the need for high-volume, high-speed manual typing. At the same time, the applications of keyboards have expanded into new areas. These now include incidental use in a broad spectrum of occupations, as well as in homes and schools for entertainment, education and communication. The full-lime professional typist is now a rarity, but occasional typists are everywhere. New computer control functions use letter sequences which do not appear in normal language, or they use single letters with no sequences at all. The common thread through all these changes is that they all call for greater ease of use, with less training, on a more user-friendly keyboard, with less importance placed on economy of motion and robot efficiency.

Since keyboard applications are already so diverse and widespread, reasonable competence in the use of a keyboard should today be considered a basic skill which everybody needs, like reading and writing. Furthermore, this skill is a great asset in education, and it should be easy to acquire it early enough to use throughout the school career, whether or not it will be used regularly afterwards.

The Right Goal

One particular case serves to illustrate that the purely "scientific" approach can actually be counter-productive. The most common digraph involving Q is, of course, QU, and therefore these two letters should theoretically be separated, Dvorak has them on remote fingers. But Q is incapable of causing significant loss of efficiency due to slow finger movements, because it is so rarely used, in fact, a more likely problem is that the typist will forget where to find it? What better place to put it, then, than WITH the letter U, where it could readily be found by association with its more familiar companion. The benefit of such intuitively arranged information would far outweigh the negligible impact on the speed of the physical finger movements.

Two points are now clear: even the best attempt to provide absolute efficiency for the finger movements did not altogether do so, and this was, in any case, the wrong goal. The goal should not be to achieve maximum economy of movement at any cost, but to balance this one need against others, including the need for a user-friendly layout.

OBJECT OF THE INVENTION

In accordance with the foregoing, the objects of this invention include the following.

To provide a method of determining keyboard letter allocations which give the best possible compromise between the conflicting requirements of current considerations; and thereby to specify a configuration of letter allocations which is suitable for adoption as a new universal standard.

To provide more efficient letter allocations than those on the present standard keyboard.

To provide a set of letter allocations which is visibly logical and user-friendly, and which falls within familiar or recognizable divisions and patterns for ease of learning and improved retention.

To reduce the difficulties evident in existing keyboards so as to make reasonable competence on a keyboard a skill which is easily attainable by the majority of individuals.

To provide letter allocations suitable for school children.

Further and more specific objects will become clear in what follows.

Fresh Look

With the right goal in minds a fresh look at Dvorak's data is in order. This leads to a greatly simplified method of approaching the finger-movement problem, while at the same lime allowing other needs to be accommodated, thereby achieving an excellent all-round result.

Efficiency of finger movements can be approached by aiming at two simple goals. One of these goals is derived from a better understanding of the letter combinations. The other comes from applying what is known about the different finger combinations.

Dvorak's Table 1 showing letter combinations gives relative-frequency scores for 238 digraphs. By combining scores for forward, and reverse-order digraphs into a single total for each pair of letters, as described earlier, these 238 digraph scores are consolidated into 155 scores for pairs of letters.

These scores range in value from 1 to 162, so it is reasonable to say arbitrarily that any value over 100 is a high score indicating a very well-used letter pair. Similarly, that values from 51 to 100 indicate pairs used with moderate frequency; and that any pair scoring 50 or less is of low-frequency usage.

Wrong Cut-Off Point

Out of the total of 155 pairs, there are but three in the high-frequency range, and only seventeen in the medium range. That leaves 135 pairs of letters in the low-frequency range, so many that it seems to indicate that they must be the controlling factor for efficiency. However, that is a misleading illusion, and it is, in fact, a few high-frequency pairs which dominate overall typing efficiency. This is dramatically demonstrated by adding up those lower scores. From the bottom, it takes more than one third of the list—58 pairs in fact—to have a combined effect equal to the single pair at the top of the list.

The illusion is created because the frequency scale has the wrong cut-off point, many of those measurable frequencies are so low as to be insignificant. As a sample gets very large, even the rarest events occur enough times to measure, and below a certain level scores for these rare events should be ignored. The most reasonable way to determine the right level is as a fraction of the highest score. The present low score to high score ratio is 1:162. A more appropriate ratio might be 1:5 or 1:10, which would cut off scores below 32 or 16 as too small to matter. As it is, scores are included going all the way down to 1, a frequency which is next door to "never".

Thus there is little point in following Dvorak, and working to place all such pairs in ideal positions. Attention should focus on the high-frequency pairs, and if one correct pair is chosen, more benefit can accrue from properly locating it than from doing likewise with 50 of the wrong pairs. The full relevance of this only becomes clear when it is appreciated that fixing the position of a "right" pair or a "wrong" pair has an equal cost in terms of freedom to meet other requirements.

The Two Goals for Finger Movements

From the above comparison of the impacts of low-frequency versus high-frequency letter combinations, the first goal for finger-movement efficiency should be to put the high scorers in good positions- ideally, in the same row, and on separate hands.

The second goal comes from applying the information about the relative speeds of various finger combinations. For digraphs which must be typed by one hand, they should ideally use two remote fingers. However, as has been seen, adjacent fingers are not even 6% slower than remote fingers, whereas same-finger digraphs are 43% slower. The important point, then—seven times more important than worrying about adjacent fingers—is to put only low-frequency pairs onto single fingers.

Since the aim is to provide a best compromise between conflicting requirements there can be no absolute rules for any one requirement, such as achieving efficient finger movements. Thus no values can be specified for the highest acceptable frequency on a single finger, or for any similar numbers. Instead, these two simple goals provide physical efficiency guidelines within which various user-friendly layouts can be explored.

Psychological Requirements

Where finger-movement requirements are primarily physical, other "user-friendly" requirements are primarily psychological. The keyboard should have a logical layout that the user will find easy to recognize, classify, learn, remember, visualize, and recall after prolonged periods of non-use.

To learn and remember a list of 26 independent locations is difficult for most people, and much easier if it can be broken down into smaller units. One approach is to divide the alphabet into vowels and consonants, as Dvorak did, but even if the ambiguous Y is classified as a vowel, there remains a group of 20 consonants, which is still too big for a single group. No other categories of letter exist to provide any other "natural" split.

An alternative approach is to use the rows and columns of keys to divide the letters into groups, but in the absence of three or ten, different categories of letter, there is no logical or best way to distribute 26 letters into three rows, or across ten columns. Each row can be divided into left-hand and right-hand groups of five, and although the group of five vowels is a good fit into one of these half-rows, there is no immediately obvious way to divide the remaining 21 letters.

Dividing the alphabet numerically lends itself only to division into 2 or 13; 13 is far too many groups, so 2 halves is the only likely possibility. This is insufficient on its own because the groups are still too large, but it does, in fact, provide one step towards a successful solution.

Yet another possibility is to use the key layout to help create a "cognitive map" of the keyboard, dividing the letters by location instead of by number. This actually provides another step towards the solution by permitting further divisions into smaller groups, but it still does not suggest any way to determine the content of those groups.

The Human Operator

Since neither the categories of letters nor the layout of the keyboard suggest useful letter assignments, the only other possible source of meaningful assignments is the human operator. In Dvorak's day, the majority of keyboard operators fitted a common profile: they were adult females who had chosen typing as a full-time occupation, and put some considerable time and effort into learning the skill. Operators today are male or female, child or adult and likely to be expected to cope with keyboard operation with little or no formal training, often as an incidental part of some other occupation. Happily this diverse cross-section of humanity does have one thing in common: every operator learned alphabetical order by rote in kindergarten, and takes a refresher course every time he or she uses a telephone directory, or any filing system.

The argument in favor of using alphabetical order is overwhelming, and becomes stronger as time goes by. The trend for keyboard skills to be incidental to another task, rather than being the primary task itself, will continue; the keyboard should be instantly usable by anyone, and those skills must therefore be greatly simplified. Also, given such a keyboard, the learning of the alphabet, reading, writing, and computer use could all progress together in a mutually reinforcing manner.

Alphabetical order is so ubiquitous it is sometimes overlooked altogether and yet its importance for keyboards can hardly be stressed too much. It is truly universal throughout the literate population, and is so familiar that some people can recite it backwards as well as forwards. It's not so much that the alphabet is exactly and precisely what is needed for the job; the alphabet IS the job.

Despite all this, the two most successful letter arrangements ever—qwerty and Dvorak—both teach away from using an alphabetical order. However, I will show how it can be used to advantage in arriving at a compromise between conflicting requirements, to yield a far better overall arrangement than any at present available. The present difficulty is in maximizing the benefits of alphabetical presentation, while avoiding conflicts with the physical requirement for easy finger movements.

Alphabetical Possibilities

There are many ways to assign the letters to the keys in an alphabetical order. The simplest is to start at the top left and proceed left-to-right, top-to-bottom, until all the letters are assigned. The four remaining keys may then be used for punctuation marks. However, this simplest method is not necessarily the best.

Possible alternatives include starting on the home row instead of the top row, since this is where the fingers normally start. Or, in order to relate the letters even more closely to the fingers instead of the keys, the sequence could begin with the first or index fingers; that means starting the sequence in the middle of the keyboard instead of at the end. Similarly, it could begin with the little fingers and work inward toward the middle from the ends of the keyboard.

Whatever the starting point, progress may be made either by using the fingers on one hand sequentially, or by alternating between the hands. Each of these methods can be justified for one reason or another, but the reason has to be balanced against the utility of the resultant pattern, and against the impact on the physical finger movements during the typing of real words.

Useful Visual Pattern

The utility of the resultant pattern depends entirely on the ease with which it is recognized and understood by the keyboard user. A pattern which is visually in alphabetical order will be instantly recognized as "intuitive", whereas a pattern alternating between the left and right hands would destroy that intuitive visual quality. The sequence must therefore proceed to adjacent keys, not to opposite hands. That the sequence should proceed from left to right as in reading, rather than from inner to outer keys, is a somewhat less crucial factor for easy visual recognition.

These conclusions are by no means obvious, in fact once again the prior art teaches away from them. With letter assignments on the Dvorak keyboard already fixed by other factors, freedom of choice only applied to numerals, so Dvorak keyboards were produced with numerals in an alternating sequence from the middle outwards, 7531902468.

Visually, the starting point should be the top left-hand corner, but logically the home row is a possibility since it is the starting position for the fingers. However, starting on the home row leads logically to the lower row next, but illogically to the top row after that so the home row is not a good place to start.

Testing the First Possibility

Contradicting the prior art three times over to assign letters alphabetically, sequentially, and from left to right, the simplest arrangement follows across the three rows in turn. Using, as examples only, the same four punctuation marks that Dvorak assigned to the remaining keys, the respective sequences for the upper, middle and lower rows of alphabetical characters would be:

| Upper Row: | A | B | C | D | E | F | G | H | I | J |
|---|---|---|---|---|---|---|---|---|---|---|
| Home Row: | K | L | M | N | O | P | Q | R | S | T |
| Lower Row: | U | V | W | X | Y | Z | ; | , | . | ' |

However, there are difficulties with this solution. Neither ER nor TH complies with the goal of assigning the highest-scoring pairs to a single row on opposite hands. Each has one letter in the upper row and one in the home row, and T and H being in eighth and tenth positions along their respective rows, are on the same hand. Considering then the "same-finger" goal, we need to improve significantly on the qwerty total of 170 for all fingers; but at fourth and fifth positions, D, E, N, O, X and Y are all on the left index finger. NO (76), ND (72), EN (66) and OY (58) far exceed the qwerty total on this one finger alone.

If adjustments are made by starting the upper-row sequence with one or more punctuation marks, moving the letters on accordingly, some of the undesirable same-finger sequences simply move on as a pair to another finger. Inserting punctuation marks in carefully-chosen positions between the letters can break up the awkward pairs, but this upsets the visual pattern of the alphabet and tends to create new awkward pairs; for instance, by splitting IS (scoring 53), but bringing together IT, which scores higher (72). In fact, while some improvements can be made, this method of alphabetical sequencing does not work very well for efficient finger movements.

A Better Basis

Bringing together many different factors yields a much better arrangement.

Consider the following lists, which rank all twenty letter-pairs having scores over 50, i.e., the medium, and high-frequency groups:

High Frequency: ER,162; TH,149; (HE,117).

Medium Frequency: (OU,98); AN,92; IN,88; (OT,85); (NO,76); IT,72; DN,72; (AH,66); EN,66, ET,65; (OR,65); AT,64, FO,62; EV,59; (OY,58); ES,57; IS,53.

Study of these lists reveals that the majority of the most common digraphs include letters from opposite ends of the alphabet. Specifically, thirteen pairs have one letter in each half of the alphabet, whereas only seven pairs (those in parentheses) have both letters in the same half of the alphabet. Therefore, if the first and second halves of the alphabet are split across the left and right hands, about two-thirds of the medium, and high-frequency pairs, including the two highest-scoring pairs, will be likewise divided into the faster sequences across two separate hands. This alone will go a long way towards meeting the first goal for reasonable efficiency. The particular letters involved in the thirteen split pairs are A, D, E, F, H and I in the first half of the alphabet, and N, O, R, S, T and V in the second half of the alphabet.

Most people are familiar with M-N as the mid-point in the alphabet, and can intuitively guess whether a particular letter belongs in the first half or the second half Placing the first half in the left hand and the second half in the right takes advantage of this intuitive knowledge, so the typist knows already which hand to use for any letter. This split therefore provides a sound start for meeting psychological as well as physical requirements.

Although there are countless different childhood chants dividing the alphabet into as many different phrases, some roll off the tongue more easily than others, and are therefore more familiar. For example most people will recognize N O P Q and R S T U as "natural" groupings, whereas O P Q R and T U V W will seem somewhat contrived. If such familiar groupings of letters can be readily identified on the keyboard, the keyboard itself will be much easier to learn and remember.

Arranging the alphabet on "separate" halves of the keyboard for two separate hands implies a division of each row into two halves with five keys each. Dividing the thirteen letters of one half of the alphabet between three half-rows of five keys each allows the letters to be divided into convenient small groups of three, four or five letters each. Appropriately bringing together the "natural" groups of letters and the half-rows of keys allows the familiar roll-off-the-tongue letters to be associated with easily-identified keyboard locations.

The choice of which four punctuation marks to include with the primary set of characters has varied with time and place, and is likely to continue to do so. However, their locations are important for two reasons.

One reason is that in themselves, they constitute a separate set of characters distinct from the letters, and their locations should reflect this.

The other reason is that the locations of the letters and punctuation marks are dependent on each other: by judicious choice of these locations, the characters can be arranged to optimize the balance between physical and psychological requirements. For the physical requirements, this includes: arranging the most common two-hand sequences onto single rows; and minimizing the frequency of same-finger sequences. For the psychological requirements, it includes utilizing visual patterns and symmetry, as well as the familiar letter groups, for the creation of the best possible cognitive map. Again, no one requirement dominates, all are to be balanced against the others for the best possible compromise

DESCRIPTION OF THE PREFERRED EMBODIMENT

In accordance with the aims and objectives already described, the preferred embodiment of this invention assigns the characters to the basic set of thirty keys in the following left-to-right arrangement.

The upper row of alpha character keys carries the sequence:

A, B, C, D, punctuation mark, punctuation mark, N, O, P, Q

The middle or home row carries the sequence:

E, F, G, H, punctuation mark, punctuation mark, R, S, T, U

And the lower row carries the sequence:

I, J, K, L, M, V, W, X, Y, Z

Figure 2:
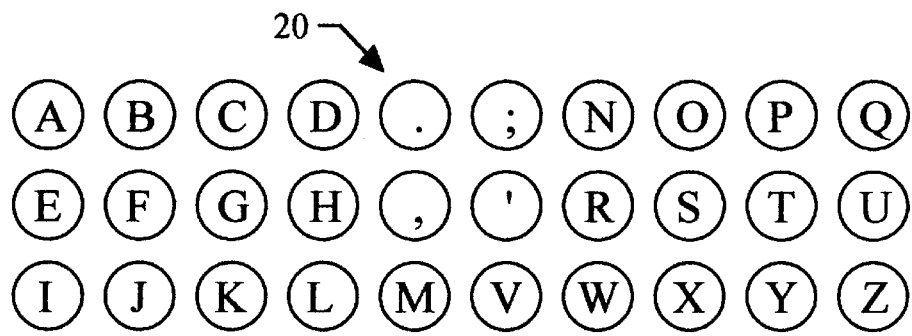
FIG. 2 shows the optimum arrangement of letters for a user-friendly and efficient, general-purpose keyboard in the preferred embodiment of my invention.

This arrangement of characters for my preferred embodiment is shown in FIG. 2. To complete the sequences of characters in FIG. 2, punctuation characters are inserted by way of example only on a group 20 of four keys in the middle of the top two rows. The positions of the punctuation marks are relevant, but the particular characters may vary. The exemplary characters chosen are consistent with Dvorak.

Advantages in Efficiency

For greatest efficiency of finger movement, the high-frequency pairs should be in the home row, and on separate hands. My keyboard does better than either qwerty or Dvorak in both these respects.

Qwerty does not have any of the three high-frequency pairs (ER, TH, HE) in the home row, and Dvorak splits the top-scoring pair (ER) between the middle and upper rows. Only in the present invention can all three high-frequency pairs be typed without leaving the home row.

Qwerty has only one out of these three pairs separated across opposite hands, while Dvorak and this invention succeed for two out of the three. However, the detrimental effect of the third pair is greater in Dvorak's keyboard than in mine, since in mine it is the lowest-scoring pair (HE,117) which remains in the less desirable position, whereas with Dvorak it is a pair scoring substantially higher (TH,149). Also, where I compromise only to a second-best position on remote fingers, Dvorak goes to third-best on adjacent fingers.

Thus for efficiency of finger movements in the crucial group of high-frequency letter pairs, my keyboard will perform significantly better than the most efficient prior-art keyboard ever devised.

This embodiment also meets and exceeds the most important goal for the medium-frequency pairs, since none of them are on the slow, same-finger sequences. In fact, the majority are far better-placed than merely avoiding the worst positions, being on the fastest sequences across alternate hands. Only six out of seventeen are even on one hand, and not one is a same-finger sequence.

In addition to meeting this goal for every medium-frequency pair with a score over 50, this embodiment also does so for many low-frequency pairs with scores below 50. In fact before any pair is found on the same finger, we must go down the low-frequency list to a score of 29 for OS, even then, it is only a "reach" across adjacent rows, not a "hurdle" between upper and lower rows.

The highest-scoring same-finger hurdle in this embodiment is DL with a score of 16, a score so low it would not have been recorded with a cut-off ratio of 1:10. Dvorak's same-finges hurdles both have insignificant scores, and qwerty is much worse with the same-finger hurdle CE having a frequency of 38.

It comes as no surprise that this embodiment far surpasses the performance of the standard qwerty. What is less expected is that it far exceeds the goals set for reasonable efficiency of physical movement, and for the all-important high-frequency pairs, it beats by a wide margin the supposed "total efficiency" model designed by Dvorak. Without even considering the other aspects of its user-friendly nature, by comparison with the prior art my keyboard has considerable merit for efficiency alone. This is an astonishing result for a keyboard that was expected to sacrifice some efficiency in order to meet other requirements.

Obsolete Concern

Re-visiting an earlier time when the frequency of individual letters was the chief concern in keyboard improvements, the letter E received much attention as the most commonly used letter. This was a major factor on mechanical typewriters, which required appreciable physical strength in the fingers to strike each key repeatedly with sufficient force. This embodiment may therefore be criticized for placing E on the weaker little finger. However, in modem applications, the force required on a key is designed to suit the fingers rather than the other way round, and physical strength is not a concern.

If the letter E were anywhere other than on the home row, then dexterity would be of interest but as long as it is on the home row, no finger movement is required to find it, and thus neither strength nor dexterity is of much significance. The status of E as the most common letter is not very relevant in the context of modem keyboards, the emphasis needs to be on letter sequences, and on what goes on in the operator's head.

Advantages in User-Friendliness

Some of these advantages are immediately apparent. The alphabet progresses sequentially along the keys, row-by-row through the left portion of the keyboard, then the right, following the familiar flow of a written pages in a book. This intuitive arrangement of letter allocations visually and logically presents the keyboard as separate left and right portions matching the left and right hands.

The punctuation marks as a group are readily distinguished from the letters, and form a coherent visual group. The central location of this group has a number of advantages.

The group visually emphasizes the alphabetical division between left and right portions of the keyboard, and between areas for left and right hands of the operator. Since it occupies keys in the "extra" columns assigned to the index fingers, this helps to differentiate these two columns from the other columns, since all the rest are home-place columns.

It also leaves exactly one letter for each finger in the home row, helping to indicate the correct home position of the hands, prior-art keyboards typically have two letters for each index finger, and a continuous string of letters along the home row, with no discernible left-right division.

With two punctuation marks in the home row, and two immediately above in the upper row, they also help to indicate any slope of the columns assigned to the fingers, without further instruction. On existing keyboards, many typists are still unsure of the left-right division even after several lessons.

The symmetry of the letter/punctuation mark allocations further reinforces the left-right division, and makes it easier to remember the whole layout.

Full advantage is taken of the small groups of keys produced by dividing the rows into left and right, by allocating, as far as is possible, the familiar groups of letters to these identifiable groups of keys. Thus these roll-off-the-tongue letters can readily be associated with specific parts of the keyboard, which further enhances the easy learning and retention.

This arrangement achieves all the psychological ideals of: instant recognition; intuitively familiar layout and logic; ready relating of keyboard to hands, and easy learning, retention and visualization of the letter allocations. Irrespective of any concessions made to physical efficiency, it is perhaps the most perfect and user-friendly layout which could be devised for the essentially random collection of letters we call the alphabet.

Overall Benefits

This keyboard is far more efficient than qwerty, and far more user-friendly than Dvorak.

It is, without compromise, as user-friendly a layout as could be wished for, which at the same time ensures a remarkable level of physical efficiency. The speed advantage of the latter is further enhanced by the psychological benefits of the intuitive array. This makes for a truly outstanding end result in terms of overall performance, including speed and ease of learning, efficiency in use, and user satisfaction.

OTHER EMBODIMENTS

Figure 3:
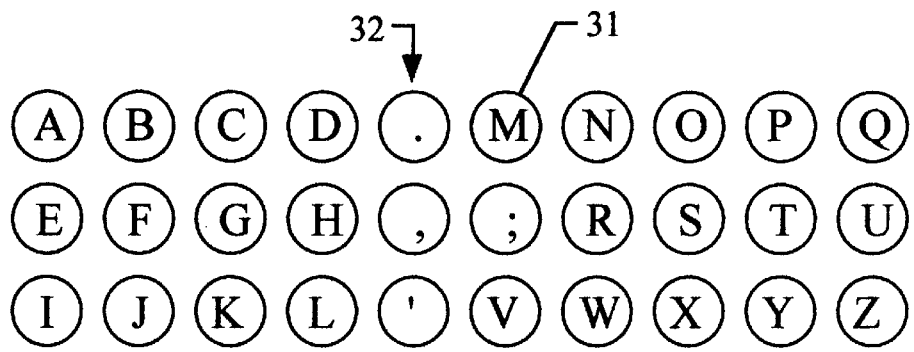
FIG. 3 shows a letter arrangement which is less symmetrical but more efficient.

Many different embodiments are possible, according to the desired result and the criteria used to measure success. For example, to increase efficiency, the letter pair EM is a borderline, medium-low-frequency pair on remote fingers of the left hand; although this is the fastest combination for fingers on one hand, the speed could be increased a bit further by splitting this pair across two hands. This can be done by, sa y, assigning the letter M to a key 31 on the right hand side as shown in FIG. 3, and assigning three punctuation marks to the inner column 32 of keys for the left hand.

If we apply Dvorak's somewhat dubious measure of performance based on all letter pairs with measurable frequencies, this change in the location of the letter M yields an increase in efficiency as follows. For the left-hand, four awkward letter sequences are eliminated: AM, BM, EM and IM, with a total frequency of 97. For the right-hand, six awkward letter sequences are created: MO, MP, MR, MS, MU and MY, with a total frequency of 57. This yields a net reduction of 40 in the total frequency of awkward sequences, indicating a modest gain in efficiency.

However, all the one-hand sequences that were eliminated were relatively fast, remote-finger sequences, whereas the most common of the newly created sequences, MO, is a somewhat slower, adjacent-finger sequence; therefore the net gain in efficiency is less than it appears to be from the raw scores. Also, the number of different awkward sequences has increased by two, so there is more work for the operator to do in learning to handle each individual problem sequence. This further erodes any gain in physical efficiency, and there are in any case significant disadvantages for the psychological aspects. By moving the M to the other side, the familiar mid-point split of the alphabet has been lost, the separate grouping of the punctuation marks is less clear, and the visual left-right symmetry of the array has been destroyed. This cost for a small improvement in physical efficiency makes this embodiment less suitable than the preferred embodiment for electrical keyboards. This particular embodiment would be more worthwhile on a mechanical keyboard where the physical efficiency is more critical.

With fifteen keys and thirteen letters per hand in this arrangement up to two letters could be transferred to the opposite side without disrupting the alphabetical order, and similar logic applied to L results in a net gain of 78 in the frequency of two-hand sequences. However, such changes cannot be made at will without regard to consequences, which can be surprisingly severe.

For instance, transferring N to the left hand creates a net loss of 242 two-hand sequences (exchanged for a net gain of 242 more-awkward one-hand sequences); but the effect does not end there. In order to maintain alphabetical order, the letter I must be moved up to the home row so the lower-row letters can be moved one place to the left to make room for N. This puts D, H, I, M and N on the left index finger, adding up to a devastating total frequency of 229 same-finger sequences on this one finger alone; that's about twice the total for all eight fingers before N was moved over. The situation is complex, and the ripple-effects far-reaching.

Other embodiments may strike different balances according to specific needs, but are unlikely to have the wide appeal and universal application of the preferred embodiment. For example, if the location of E as the most common letter is a high priority, it can be allocated to the home position of the right index finger by interchanging it with R. The letters in general remain in substantially alphabetical order, retaining most of the associated advantages, with just these two exceptions to learn. Although this move loses the benefit of two-hand splits for some medium-frequency pairs, it gains the benefit of splitting the high-frequency pair HE across two hands, thus achieving optimum sequencing for all three high-frequency pairs.

Where some such minor disruption to the alphabetical order is acceptable, there are other possibilities. Looking again at the list of medium-frequency pairs, it can be seen that the six, same-hand pairs (shown in parentheses) include five which involve the letter O. Moving O across to the left hand eliminates same-hand pairs on the right hand having a total frequency of 465, and creates new same-hand pairs on the left totaling 212, for a fairly significant net benefit of 253. Also, one of the same-hand sequences eliminated is the highest scoring same-finger sequence, OS.

The highest-scoring left-hand pair involving O is then FO, so F is an obvious possibility for exchanging places with O, and would yield a net improvement of 82. Other exchange candidates include H with an improvement of 81, and M with 106. Since M can be moved without further disruption to the alphabetical order, it appears to be the best choice for an exchange.

However, with R, T and U in the home row, the benefits of moving O would be maximized by locating O in the home row too, thereby making OR, OT and OU optimum, alternate-hand, home-row sequences. Yet another new principle can be applied here to get the best of both worlds.

Figure 4:
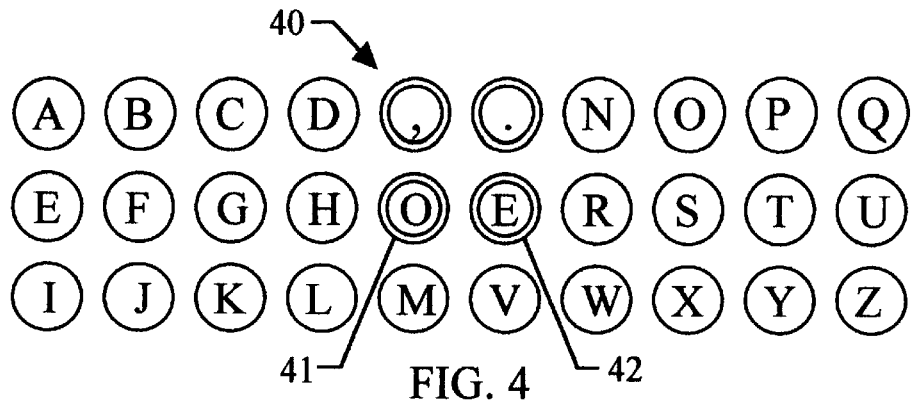
FIG. 4 shows a letter arrangement using duplicate keys for greater typing speed.

The alpha character keys and the alpha characters have always had a direct one-to-one relationship, which was originally a necessity because of mechanical limitations. With an electrical keyboard, it is merely a matter of convenience, and there is nothing to prevent the use of duplicate keys where circumstances warrant it. In this case, as shown in FIG. 4, it would be convenient to provide a duplicate key 41 for the letter O in a left-hand home-row position, thereby allowing every letter-pair involving O to be typed as a two-hand sequence. This could be achieved by displacing the punctuation mark that had been assigned to the innermost of the two columns assigned to the left index finger.

Duplicating the letter O in this manner would leave the entire alphabetical order intact for the benefit of new or occasional users: and it would permit the expert typist to achieve greater efficiency by choosing whichever O-key was appropriate to avoid awkward finger sequences.

One disadvantage to this is displacing a punctuation mark to some position outside the primary set of thirty keys: this is not a great disadvantage for the least-used punctuation mark, and has little impact on any conventional arrangements, since punctuation marks are not very standardized anyway. Another disadvantage is that the visual alphabetical order is disturbed by the addition of another O after H; this can be countered simply by using a distinctive background color for the group of four keys 40 that are not included in the 26 keys in alphabetical order. This is indicated in FIG. 4 by a double outline for the keys of distinctive color.

The same principles can be applied to other letters. For example, the letter E can be duplicated on a key 42 in the right-hand position symmetrically-opposed to the extra O. Using for example the comma and period to indicate the positions of the remaining punctuation marks, the character allocations would then be as shown in FIG. 4.

For the top twenty pairs of letters, i.e, the complete medium, and high-frequency lists, this arrangement achieves two-hand sequencing for all but one pair (AH, 66); even this pair is on the best of the one-hand sequences, using remote fingers. All same-finger sequences with more than one-tenth the frequency of ER have been eliminated, the highest now being DL with a score of only 16. For the regular user willing to develop slightly more than the most rudimentary skill, this embodiment provides a very efficient keyboard without losing the user-friendly features already in place for the occasional user.

CONCLUSION

Clearly, this invention provides a keyboard that is in every respect far superior to the existing qwerty standard, and a far better choice than the best alternatives previously available. It is also clear that since there is little, if any, room for further improvement over FIGS. 2 and 4, one of them will eventually and inevitably become the final standard.

It will find application as a new alphabetical standard for keyboards supplied as original equipment, and also in multi-mode keyboards for special purposes. These will include both alpha-Dvorak and alpha-qwerty keyboards, the former as an accessory to existing qwerty-only equipment, and both types for sharing one keyboard between existing skilled typists and new users.

Other more specialized applications will benefit from different embodiments employing the same principles, only a few of which have been described, and it is intended that this invention shall include all such variations.

I claim:

1. In a keyboard having a left zone with at least four columns of keys for a left hand
   and a right zone with at least four columns of keys for a right hand,
   and having a plurality of keys arranged in columns with letters of an alphabet assigned to at least some of said keys,
   and having a majority of said letters in any alphabetically-ordered keyboard arrangement progressing from left to right,
   said alphabet having a beginning portion including at least ten characters selected from a first half of said alphabet and an ending portion including at least ten characters selected from a second half of said alphabet,
   an improvement wherein
      said beginning portion of said alphabet is in said left zone of said keyboard and
      said ending portion of said alphabet is in said right zone of said keyboard.

2. The keyboard of claim 1, wherein
   said letters are arranged on three rows of keys.

3. The keyboard of claim 1 wherein
   said alphabetically-ordered keyboard arrangement progresses line by line, from top to bottom, and from the left zone to the right zone.

4. The keyboard of claim 1 wherein
   none of the letters N, R, T, U or Y are assigned to the same column as the letter O.

5. The keyboard of claim 1 wherein
   said beginning portion contains 13 letters.

6. The keyboard of claim 1 wherein
   at least one letter is duplicated in each of said zones.

7. A keyboard, having a plurality of keys arranged in rows, and having characters assigned to at least some of said keys, and having one of said rows designated as a home row, wherein
   a row above said home row has characters A, B, C, D, any character, any character, N, O, P, Q, from left to right,
   said home row has characters E, F, G, H, any character, any character, R, S, T, U, from left to right,
   and a row below said home row has characters I, J, K, L, M, V, W, X, Y, Z, from left to right.

8. A keyboard having characters assigned to columns of keys, wherein said characters are assigned from top to bottom of individual columns as follows:
   a left column has A, E, I;
   a column first adjacent to the right of said left column has B, F, J;
   a column second adjacent to the right of said left column has C, G, K;
   a column third adjacent to the right of said left column has D, H, L;
   a right column has Q, U, Z;
   a column first adjacent to the left of said right column has P, T, Y;
   a column second adjacent to the left of said right column has O, S, X;
   and a column third adjacent to the left of said right column has N, R, W.

9. The keyboard of claim 8 wherein
   a column fourth adjacent to the right of said left column has any assignment, any assignment, M;
   and a column fourth adjacent to the left of said right column has any assignment, any assignment, V.

10. The keyboard of claim 8 wherein
    a column fourth adjacent to the right of said left column has punctuation mark, punctuation mark, M;
    and a column fourth adjacent to the left of said right column has punctuation mark, punctuation mark, V.

11. The keyboard of claim 8 wherein
    a column fourth adjacent to the right of said left column has any assignment, O, M;
    and a column fourth adjacent to the left of said right column has any assignment, E, V.

12. In a keyboard having a left five columns of keys assigned to a left hand with a pair of columns assigned to a left index finger, and a right five columns of keys assigned to a right hand with a pair of columns assigned to a right index finger so that each pair of said columns includes an inner column closer to the center of the keyboard and an outer column more distant from the center of the keyboard,
    an improvement wherein
       said inner column for the left index finger has punctuation marks assigned to two of said keys,
       and said inner column for the right index finger has punctuation marks assigned to two of said keys.

* * * * *